United States Patent [19]

Mucenieks

[11] 4,323,437
[45] Apr. 6, 1982

[54] TREATMENT OF BRINE

[75] Inventor: Paul R. Mucenieks, Lawrenceville, N.J.

[73] Assignee: FMC Corporation, Philadelphia, Pa.

[21] Appl. No.: 232,602

[22] Filed: Feb. 9, 1981

[51] Int. Cl.$^3$ .............................................. C25B 1/34
[52] U.S. Cl. ...................................... 204/98; 204/128
[58] Field of Search .................................. 204/98, 128

[56] References Cited

U.S. PATENT DOCUMENTS

| | | | |
|---|---|---|---|
| 3,254,952 | 6/1966 | Raleigh et al. | 23/190 |
| 3,606,466 | 9/1971 | Fernandes | 299/5 |
| 3,732,164 | 5/1973 | Pressley et al. | 210/60 |
| 3,733,266 | 5/1973 | Bishop et al. | 210/26 |
| 3,867,509 | 2/1975 | Geiger et al. | 423/210 |
| 3,969,479 | 7/1976 | Lonnes et al. | 423/210 |
| 3,970,528 | 7/1976 | Zirngiebl et al. | 204/98 |
| 4,036,713 | 7/1977 | Brown | 204/98 |
| 4,077,879 | 3/1978 | Smeck | 210/60 |
| 4,137,166 | 1/1979 | Heimberger et al. | 210/62 |
| 4,190,505 | 2/1980 | Ogawa et al. | 204/98 |

*Primary Examiner*—R. L. Andrews
*Attorney, Agent, or Firm*—Edwin B. Cave; Frank Ianno

[57] ABSTRACT

Oxidizable impurities, particularly hydrogen sulfide and ammonia, are removed from sodium chloride brines used for the electrolytic production of chlorine and caustic soda by oxidizing such impurities with hypochlorite at pH values at which the brines are commonly treated with sodium hydroxide and sodium carbonate to remove calcium and magnesium ions. The hypochlorite oxidation can be accomplished by adding to the brine the waste liquor from a scrubber in which a gas stream containing chlorine is scrubbed with a sodium hydroxide solution, which can be cell liquor. The gas stream so scrubbed can be the tail gases from the liquefaction of the chlorine produced by electrolysis of the brine.

12 Claims, No Drawings

TREATMENT OF BRINE

This invention relates to processes in which sodium chloride brines subjected to electrolysis are treated prior to electrolysis to remove impurities.

Aqueous sodium chloride brines obtained by the solution mining of underground salt deposits are one source of feed material for electrolytic processes for the production of chlorine and caustic soda. Such brines ordinarily contain varying quantities of dissolved impurities, among them calcium, magnesium, iron and sulfate ions, as well as impurities such as hydrogen sulfide and ammonia which are susceptible to oxidation during the electrolysis of the brine. Ionic and oxidizable impurities may also be found in brines from other sources.

It is known in the art to reduce the calcium, magnesium, iron and sulfate content of these brines to acceptable levels for electrolysis by adding sodium hydroxide and carbonate, so as to raise the pH of the brine and cause precipitation of these impurities, and then separating the precipitated compounds from the brine. The oxidizable impurities remain for the most part in the brine where their oxidation during electrolysis not only represents a parasitic diversion of energy from the production of the desired products but also results in the formation of undesired and potentially harmful products.

Although some of the ammonia contaminant may be evolved during the treatment of the brine to remove calcium and magnesium, significant quantities remain, resulting upon electrolysis in contamination of the chlorine with explosive nitrogen trichloride and contamination of the cathodically produced hydrogen with ammonia. Similarly, the sulfide also remains in the brine where its oxidation during the electrolytic process causes waste of electrical energy and results in formation of elemental sulfur potentially detrimental to electrolytic cell diaphragms or formation of sulfur compounds potentially contaminative of the products.

Although it is possible to remove contaminants so generated from the products of the electrolytic process, this entails expense and can lead to an unsatisfactory product. Thus nitrogen trichloride can, for instance, be removed from chlorine by scrubbing with a solvent mixture of $CCl_4$ and $CHCl_3$ but traces of these solvents then remain in the chlorine, restricting its use for treatment of water supplies. The ammonia and hydrogen sulfide can be removed from the brine before electrolysis by sparging with air (at alkaline pH for ammonia and at acid pH for hydrogen sulfide) but this requires expensive equipment and processing and can create air pollution problems unless additional precautions are taken.

According to the present invention, impurities susceptible to oxidation during electrolysis, particularly ammonia and hydrogen sulfide, are effectively removed from sodium chloride brine prior to electrolysis by adding hypochlorite ions to the brine, preferably while it is maintained at pH values in the vicinity of those used for precipitation of calcium and magnesium from the brine. At these strongly alkaline pH values, the sulfide is oxidized primarily to sulfate by the hypochlorite and the ammonia is oxidized primarily to elemental nitrogen. If the pH values at which this oxidation takes place are lowered, the sulfide tends to be oxidized additionally to elemental sulfur and various lower sulfur oxyacids, and nitrogen formation from ammonia tends to be replaced by the formation of dichloroamine and nitrogen trichloride.

The hypochlorite ions may be added to the brine in any convenient manner. Thus commercial NaOCl can be used (usually available as an aqueous solution containing about 15% by weight of NaOCl) or chlorine, either pure or waste, can be directly introduced into the alkaline brine where it is converted to sodium hypochlorite by reaction with the sodium hydroxide which is present.

A more economical source of sodium hypochlorite for the purposes of the present invention is the waste liquor obtained by the scrubbing of gas streams containing waste chlorine with an aqueous solution of sodium hydroxide or with the caustic cell liquor produced by the electrolysis of the sodium chloride brine (which may have a substantial sodium chloride content). Such a waste liquor may result, for instance, from the scrubbing of the tail gas from the liquefaction of the electrolytically produced chlorine to remove residual chlorine prior to release of such tail gas to the atmosphere. The sodium hypochlorite concentration of such waste liquor may be typically about 5% by weight. Similar liquors from other chlorine scrubbing operations may also be used as hypochlorite sources. The introduction of such waste liquors into the brine prior to electrolysis not only serves to provide a source of hypochlorite for elimination of oxidizable impurities, particularly sulfide and ammonia, from the brine but also serves to eliminate the problem of disposing of such liquors, which must first be treated to decompose the hypochlorite if they are to be discharged into the environment. Moreover, in the practice of the present invention, the soda and chlorine values in the waste liquor are returned to the process and recovered.

In order to avoid, insofar as possible, the formation of less desirable oxidation products, the hypochlorite treatment of the brine is preferably carried out at a pH of at least 10, more preferably at a pH of at least 11 and desirably at a pH in the vicinity of 12. Ordinarily this procedure will not be carried out at a pH in excess of about 13.5 and more commonly the pH will not exceed about 13.

The oxidation of sulfide and ammonia in the brine will ordinarily take place rapidly. The sulfide oxidation occurs almost immediately in the presence of hypochlorite and the ammonia oxidation will ordinarily be complete in ½ hour or less. Sufficient hypochlorite should be added to produce substantially complete oxidation of these substances. The addition of adequate hypochlorite can be assured by monitoring the hypochlorite content of the brine after a time sufficient for completion of the oxidation and adding a sufficient excess of hypochlorite to result in the presence of residual hypochlorite at the point of monitoring. Ordinarily a residuum of 3 milligrams NaOCl per liter of brine after the oxidation treatment is completed will be adequate to assure the desired result but larger excesses can be used. With a residuum of NaOCl in excess of 10 milligrams per liter, there may be some danger of corrosion of the materials of which certain parts of equipment are constructed which are not designed for handling NaOCl, but, with equipment not susceptible to such attack, greater excesses of hypochlorite can be used.

The hypochlorite oxidation has been found to proceed more effectively when the quantity of carbonate ions in solution in the brine has been limited during the oxidation. Improved results have been obtained when the carbonate content of the brine, calculated as $Na_2CO_3$, has not exceeded about 2 grams per liter, at least during a portion of the oxidation procedure. Thus if, for instance, sodium carbonate is added, after or together with the hypochlorite, to brine containing calcium ions, carbonate ions will be precipitated from solution as calcium carbonate and only the fraction of the carbonate ions remaining in solution will thereafter exert whatever effect they have on the oxidation reaction. Some residual carbonate ions are desirable in order to assure substantially complete removal of calcium from the brine.

The process of the present invention can be applied to brines having any sodium chloride concentration appropriate for subjection to the electrolytic process. For electrolytic efficiency it is desirable that this concentration be as close to saturation as is feasible for handling. Concentrations in the vicinity of 300 grams per liter are convenient, as for instance between about 270 grams per liter and about 330 grams per liter. Concentrations as low as 200 grams per liter, or lower, can be used, but are less desirable.

The oxidation procedure can be carried out at any convenient temperature. A practical operating temperature is about 50° C., but higher and lower temperatures such as 20° C. to 80° C. may also be found convenient.

When the hypochlorite is added to the brine in the form of an aqueous solution of NaOCl, solutions having NaOCl concentrations between about 15% by weight (the concentration of commercial NaOCl) and about 5% by weight are conveniently used. Higher concentrations, if available, can of course be used. Although lesser concentrations down to about 1% by weight can be used, they become decreasingly desirable with decreasing concentration since the larger amounts of hypochlorite solution required with the lower concentrations result in undesired dilution of the brine.

When chlorine scrubber liquors are used as the hypochlorite source, they normally contain substantial unreacted sodium hydroxide which can serve as a partial replacement for the sodium hydroxide added to the brine to raise its pH so as to decrease the solubility of the undesired ions, particularly calcium, magnesium and iron. These liquors commonly will also contain substantial amounts of carbonate ions, as a result of carbon dioxide absorption, which serve as a partial replacement for the sodium carbonate added to the brine for precipitation of calcium. A typical scrubber underflow may conveniently contain about 5% by weight of NaOCl and have a pH between about 12 and about 13.9.

Subject to the conditions set forth above, the addition of sodium hydroxide, sodium carbonate and hypochlorite to the brine can be carried out simultaneously or successively in any combination or sequence. Removal of precipitated solids from the brine is carried out after insolubilization by sodium hydroxide and sodium carbonate is complete and preferably not before the hypochlorite oxidation is also completed. This separation of solids from the brine can be accomplished in any known manner, as by settling and filtration.

In a typical continuous procedure according to the present invention a solution mined sodium chloride brine having a sodium chloride concentration in the vicinity of 300 grams per liter and containing dissolved impurities in the following range:

Calcium ion—0.4-1.6 grams/liter;
Magnesium ion—20-120 mg/liter;
Hydrogen sulfide—40-140 mg/liter;
Ammonia—5-25 mg/liter has added to it, while at a temperature of about 50° C., sufficient NaOH and $Na_2CO_3$ to result in an excess of about 1.5 grams per liter of NaOH and about 0.5 grams per liter of $Na_2CO_3$ after precipitation of insolubles, resulting in a treated brine having a pH between about 11 and 12.5. To the thus treated brine is added underflow from a tower scrubber in which tail gas from the liquefaction of chlorine is scrubbed with a solution of NaOH producing a scrubber liquor containing about 5% by weight of NaOCl and about 5% by weight of $Na_2CO_3$ and having a pH between about 12 and about 13.9. This scrubber liquor is added to the treated brine in a ratio of about 1:40, monitored after a residence time for the mixture of about ½ hour at about 50° C. to yield a residue of about 3 milligrams NaOCl per liter of the resulting treated brine. Under appropriately controlled conditions, the calcium and magnesium contents of the treated brine can be reduced to less than 1 part per million and the ammonia and hydrogen sulfide contents can be reduced to below detectable amounts. The treated brine, after filtration, is passed to the electrolytic cells, where it is subjected to electrolysis with resulting production of chlorine and caustic soda. The chlorine is compressed and liquefied, the tail gases being scrubbed of chlorine with a solution of the caustic soda and the scrubber liquid containing hypochlorite being used to rid incoming brine of oxidizable impurities.

I claim:

1. The process of electrolyzing sodium chloride brine to produce chlorine and caustic soda using a brine which contains oxidizable material susceptible to oxidation during said electrolysis, said oxidizable material comprising hydrogen sulfide and ammonia, wherein the improvement comprises oxidizing said oxidizable material in the brine by means of hypochlorite ions prior to electrolysis of the brine.

2. The process of claim 1 in which the oxidation by means of hypochlorite ions is accomplished by adding to the brine a liquor derived by the scrubbing of waste chlorine from a gas stream with an aqueous sodium hydroxide solution.

3. The process of claim 2 wherein the gas stream comprises the tail gas from the liquefaction of chlorine derived from the electrolytic process.

4. The process of claim 1, 2 or 3 wherein the brine is the product of the solution mining of sodium chloride.

5. The process of claim 4 wherein the oxidation by means of hypochlorite ions is carried out at a brine pH of at least 10.

6. The process of claim 5 wherein the oxidation by means of hypochlorite ions is carried out in the presence of an excess of hypochlorite ions so as to leave a residue of such ions in the brine after completion of the oxidation.

7. The process of claim 6 wherein said residue amounts to at least 3 milligrams of NaOCl per liter of brine.

8. The process of treating sodium chloride brines containing calcium and magnesium ions and also containing hydrogen sulfide and ammonia to prepare such brines for use as a feed material to electrolytic cells, said process comprising adding sufficient sodium hydroxide and sodium carbonate to the brine to raise its pH to at least 10 and to precipitate the calcium and magnesium ions, wherein the improvement comprises establishing a sufficient hypochlorite concentration in said brine while its pH is at least 10 to oxidize said sulfide and ammonia.

9. The process of claim 8 wherein the said hypochlorite concentration is established by adding to the brine a solution of NaOCl.

10. The process of claim 9 wherein the solution of NaOCl is a scrubber liquid resulting from the scrubbing of chlorine from a gas stream with a solution of NaOH.

11. The process of claim 8, 9 or 10 wherein the concentration of hypochlorite is sufficient to leave a residue of at least 3 milligrams of NaOCl per liter of brine after the oxidation is completed.

12. The process of claim 11 wherein the concentration of carbonate ions in said brine does not exceed about 2 grams per liter, calculated as $Na_2CO_3$, during at least a portion of the time during which the hydrogen sulfide and ammonia are undergoing oxidation by hypochlorite.

* * * * *